United States Patent
von Thal et al.

(10) Patent No.: US 7,298,291 B2
(45) Date of Patent: *Nov. 20, 2007

(54) GRAPHICAL SYMBOLOGY APPARATUS FOR USE IN AN AIRBORNE REFUELING SYSTEM

(75) Inventors: German von Thal, Laguna Niguel, CA (US); Ronald G Benjamin, Lake Forest, CA (US)

(73) Assignee: The Boeing Company, Chicago, IL (US)

( * ) Notice: Subject to any disclaimer, the term of this patent is extended or adjusted under 35 U.S.C. 154(b) by 158 days.

This patent is subject to a terminal disclaimer.

(21) Appl. No.: 11/193,667

(22) Filed: Jul. 29, 2005

(65) Prior Publication Data

US 2007/0023574 A1    Feb. 1, 2007

(51) Int. Cl.
   *G08B 21/00* (2006.01)
(52) U.S. Cl. .................... 340/958; 340/953; 244/135 A
(58) Field of Classification Search ................ 340/958, 340/945, 815.45, 953; 244/135 A, 135 R, 244/129.1, 118.1, 137.1; 701/302; 356/141.2, 356/5, 152, 139.03; 250/206.1, 206.2; 345/115
   See application file for complete search history.

(56) References Cited

U.S. PATENT DOCUMENTS

| | | | |
|---|---|---|---|
| 4,025,193 A | 5/1977 | Pond et al. | |
| 4,072,283 A | 2/1978 | Weiland | |
| 4,095,761 A | 6/1978 | Anderson et al. | |
| 4,129,270 A | 12/1978 | Robinson et al. | |
| 4,158,885 A | 6/1979 | Neuberger | |
| 4,160,534 A | 7/1979 | White | |
| 4,231,536 A | 11/1980 | Ishimitsu et al. | |
| 4,264,044 A | 4/1981 | White | |
| 4,298,176 A | 11/1981 | Kendall | |
| 4,519,560 A | 5/1985 | Ishimitsu et al. | |
| 4,586,683 A | 5/1986 | Kerker | |
| 4,633,376 A | 12/1986 | Newman | |
| 4,763,125 A * | 8/1988 | Newman et al. | 340/958 |
| 4,792,107 A | 12/1988 | Fernz et al. | |
| 5,499,784 A * | 3/1996 | Crabere et al. | 244/135 A |
| 5,785,276 A | 7/1998 | Ruzicka | |
| 5,996,939 A | 12/1999 | Higgs et al. | |
| 6,651,933 B1 | 11/2003 | von Thal et al. | |
| 6,752,357 B2 | 6/2004 | von Thal et al. | |
| 6,837,462 B2 | 1/2005 | von Thal et al. | |
| 6,935,595 B2 * | 8/2005 | Butsch et al. | 244/135 A |
| 7,093,801 B2 * | 8/2006 | Schroeder | 244/135 A |

* cited by examiner

*Primary Examiner*—Brent A. Swarthout
(74) *Attorney, Agent, or Firm*—Harness, Dickey & Pierce, P.L.C.

(57) ABSTRACT

A vision system and method for use on a refueling tanker to assist a boom operator in performing an airborne refueling operation on a receiver aircraft. The system includes a digital camera system, a sensor subsystem and a processing system that receives information from the sensor system and the camera system. The processing system includes video processing capability and a graphics generator that generates a two dimensional graphics symbology set that is displayed on a display terminal along with a real time image of the boom and the receiver aircraft. The graphics symbology set includes a plurality of graphic symbols that indicate the position of the refueling boom and the position of the receiver aircraft relative to a desired contact zone within which physical contact between the boom tip and a refueling receptacle on the receiver aircraft can be made. The graphics symbology set also makes use of various colors to indicate warning conditions to the boom operator.

18 Claims, 5 Drawing Sheets

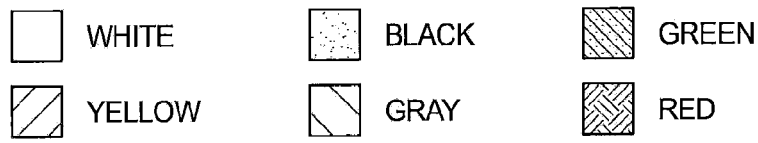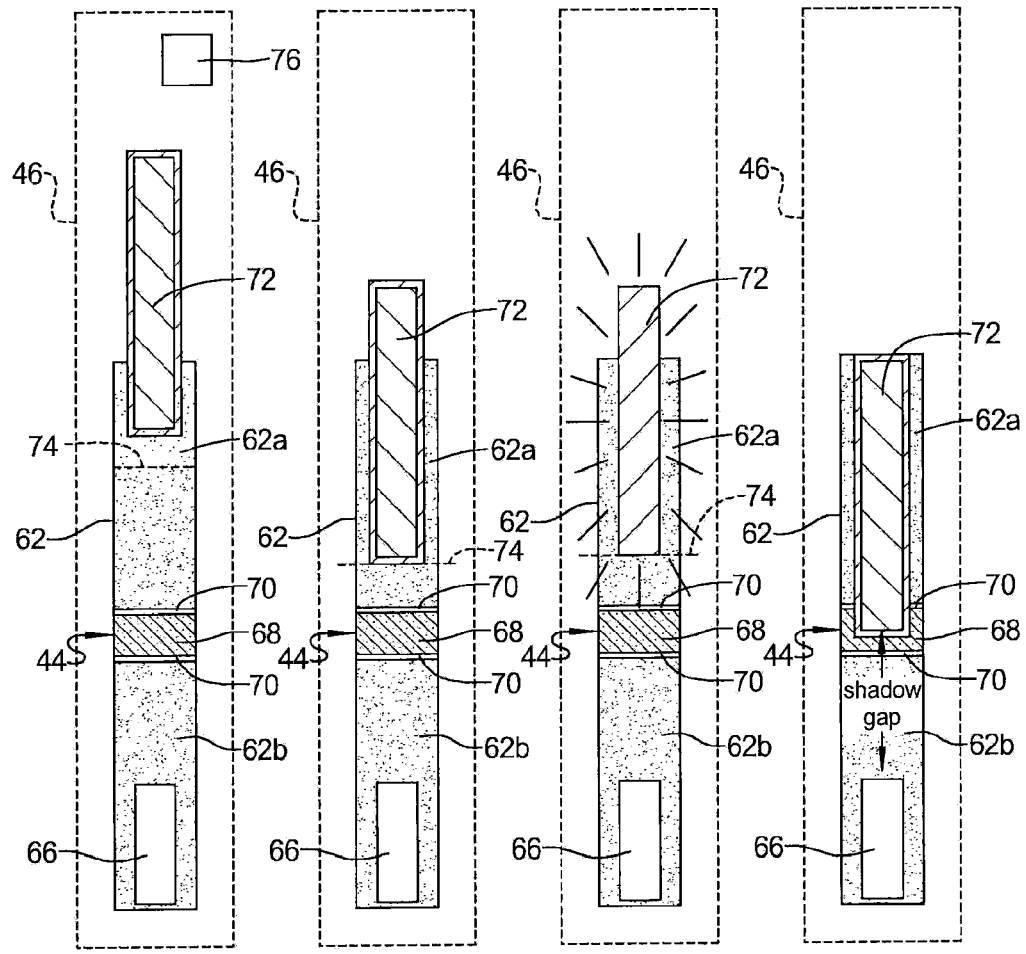

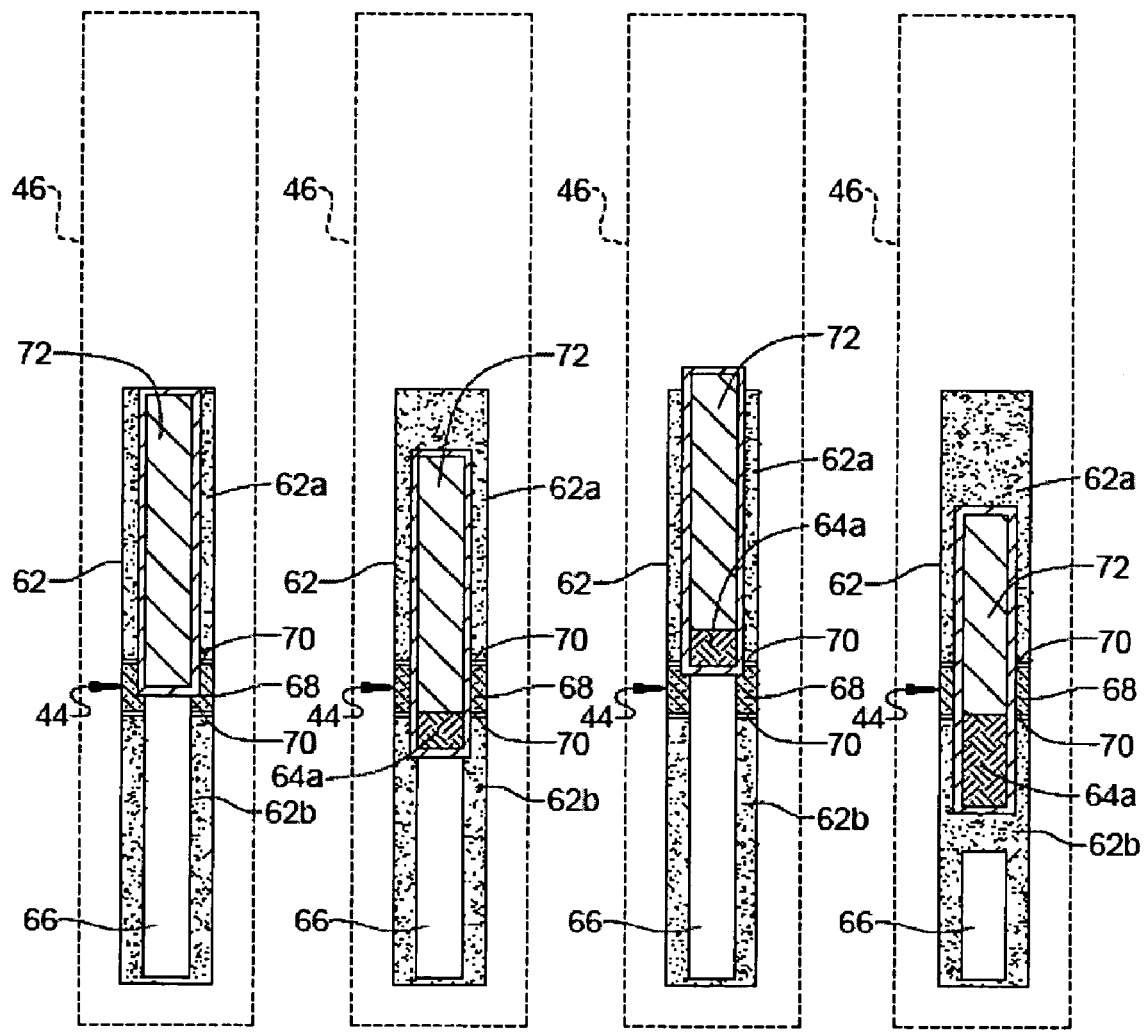

GRAPHICAL SYMBOLOGY APPARATUS FOR USE IN AN AIRBORNE REFUELING SYSTEM

CROSS-REFERENCE TO RELATED APPLICATIONS

This application is related to concurrently filed application, U.S. Ser. No. 11/193,668, entitled "Vision System And Method Incorporating Graphics Symbology For Use In A Tanker Refueling System".

FIELD OF THE INVENTION

The present invention relates to refueling systems used in tanker aircraft for providing airborne refueling to a receiver aircraft, and more particularly to a vision system and method incorporating a two dimensional graphics symbology set for assisting a boom operator in aligning a refueling boom with a refueling receptacle on a receiver aircraft.

BACKGROUND OF THE INVENTION

Present tanker aircraft typically rely on three dimensional (3D) visual or stereo vision systems that are used by the boom operator to judge distance and closure rates between the receiver aircraft and the refueling boom and/or refueling hose/drogue. Creating an observation window for real vision or implementing a stereo vision system to provide sufficient depth perception, such as a 3D vision system, can be expensive. Three dimensional vision systems require complex, multiple cameras and video processing systems. While some systems have proven effective for their intended use, it would nevertheless be desirable to provide a system that does not require the use of multiple camera, but instead a system that can be implemented using a single camera that provides a two dimensional picture of the receiver aircraft to the boom operator.

It would further be desirable if some graphical system could be employed in connection with a two dimensional image of the receiver aircraft and refueling boom to better enable a boom operator to judge the position and closing speed of the receiver aircraft during an airborne refueling operation.

SUMMARY OF THE INVENTION

The present invention is directed to a vision system for use on an airborne refueling tanker vehicle that does not require multiple cameras to provide a stereo vision image for a boom operator performing a refueling operation on a receiver vehicle.

In one preferred form the system of the present invention makes use of a sensor system that provides information on the position of the refueling boom, as well as the position of a fuel receptacle on a receiver vehicle, to a processing system. A single (i.e., mono) camera is used to image the receiver vehicle during the refueling operation. The processing system also generates, from the sensor system, a graphics symbol set that is displayed on a display system used by the boom operator. The same display system may be used for displaying the image generated by the camera on the tanker vehicle. The graphics symbol set includes a graphics symbol representing the boom, a graphic symbol representing a receiver vehicle, and a graphic symbol representing a desired contact zone within which coupling of the boom tip and the fuel receptacle on the receiver vehicle can be achieved. The information on the position of the boom and the position of the receiver vehicle is monitored by the sensor system and information is generated in real time so that the display of the graphics symbol set essentially provides a real time indication of the position of the boom relative to the refueling receptacle on the receiver vehicle.

In one preferred embodiment the graphics symbol set comprises a contact zone graphic, a foundation graphic representing lead-in areas to the contact zone, a refueling boom graphic and a receiver vehicle graphic. In one preferred implementation the contact zone graphic and the refueling boom and receiver vehicle graphics are longitudinally aligned along a common line or axis. Information from the camera system is processed and the positions of the refueling boom graphic and the receiver vehicle graphic are updated to indicate the changing relative positions of these components relative to the contact zone graphic. When the receiver vehicle graphic moves within the contact zone graphic, then the receiver boom can be telescopically extended into the contact zone to couple to the refueling receptacle of the receiver vehicle.

In one preferred implementation different colors are used for the contact zone graphic, the receiver graphic and the boom graphic. Optionally, the receiver graphic can be made to flash repeatedly in the event the sensing system detects that the receiver vehicle is approaching the contact zone at an excessive closure rate.

In another preferred implementation a receiver elevation lead-in graphic is generated and displayed on the display system adjacent to the receiver graphic symbol. When the receiver vehicle is at the proper elevation relative to the refueling vehicle, the lead-in graphic will be contacting the receiver graphic. But if the receiver vehicle is above the predetermined optimum elevation for contact between the boom and the refueling receptacle to occur, then the receiver graphic will be positioned above the elevation lead-in graphic. Conversely, if the receiver vehicle is below the elevation at which the vehicle needs to be at for proper contact to be made, then the elevation lead-in graphic will be positioned somewhere above a lower edge portion of the receiver graphic. In this manner the boom operator can visually discern, at a glance, the position of the receiver vehicle relative to the predetermined elevation at which contact needs to be made between the boom and the refueling receptacle.

In another preferred implementation a color is used with the receiver graphic to designate when the refueling receptacle of the receiver vehicle is in contact with the tip of the refueling boom, but where the refueling receptacle is positioned either excessively forwardly or excessively rearwardly of the contact zone. In this manner the boom operator can inform the operator of the receiver vehicle by RF communications that either greater or lesser separation between the receiver and tanker vehicles needs to be achieved.

In still another preferred implementation of the present invention a boom aim point graphics symbol can be provided on the display system to provide the boom operator with an indication of where the tip of the boom would contact on the refueling vehicle if the boom was to be telescoped to its fully extended length. The boom aim point symbol is projected over the image of the receiver vehicle being provided by the camera. The operator controls the boom to maintain the boom aim point graphic symbol directly over the refueling receptacle on the receiver vehicle while the boom is being fully telescoped.

The features, functions, and advantages can be achieved independently in various embodiments of the present inventions or may be combined in yet other embodiments.

BRIEF DESCRIPTION OF THE DRAWINGS

The present invention will become more fully understood from the detailed description and the accompanying drawings, wherein:

FIGS. 5A-5H illustrate the graphics symbol set indicating various conditions of the refueling boom and receiver aircraft relative to the contact zone of a preferred embodiment of the present invention.

DETAILED DESCRIPTION OF THE PREFERRED EMBODIMENTS

The following description of the preferred embodiment(s) is merely exemplary in nature and is in no way intended to limit the invention, its application, or uses.

Figure 1:
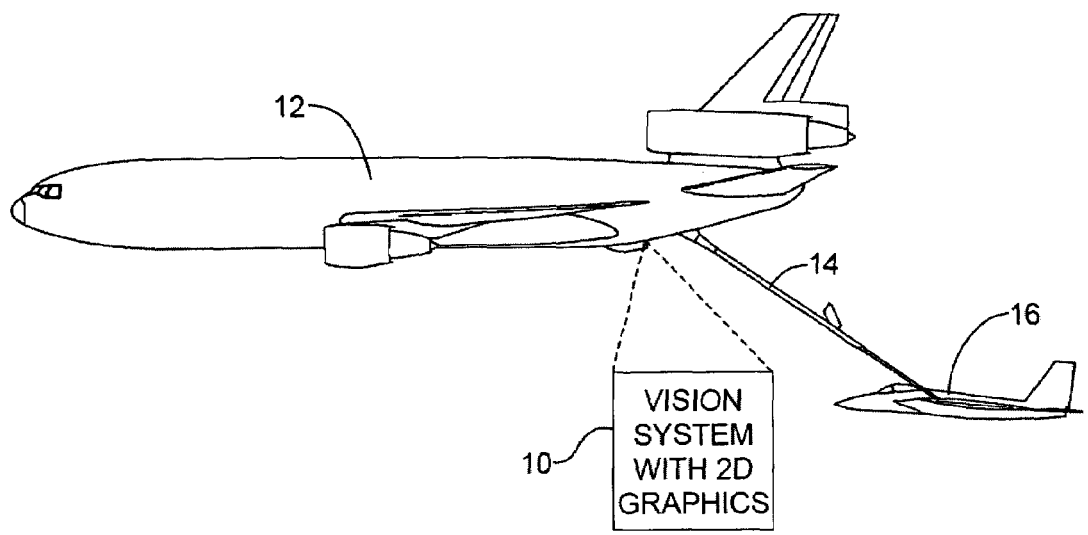
FIG. 1 is a perspective view of a refueling tanker aircraft incorporating a preferred embodiment of the present invention with a refueling boom extended fully into contact with a refueling receptacle on a receiver vehicle during an airborne refueling operation.

Referring to FIG. 1, a depiction of a refueling operation is illustrated. A tanker vehicle (i.e., aircraft or other airborne refueling vehicle) 12 carries a vision system 10 in accordance with a preferred embodiment of the present invention. The vision system 10 is used to enable the operator to control a telescoping refueling boom 14 to make contact with a refueling receptacle on an airborne receiver vehicle (i.e., aircraft) 16.

Figure 2:
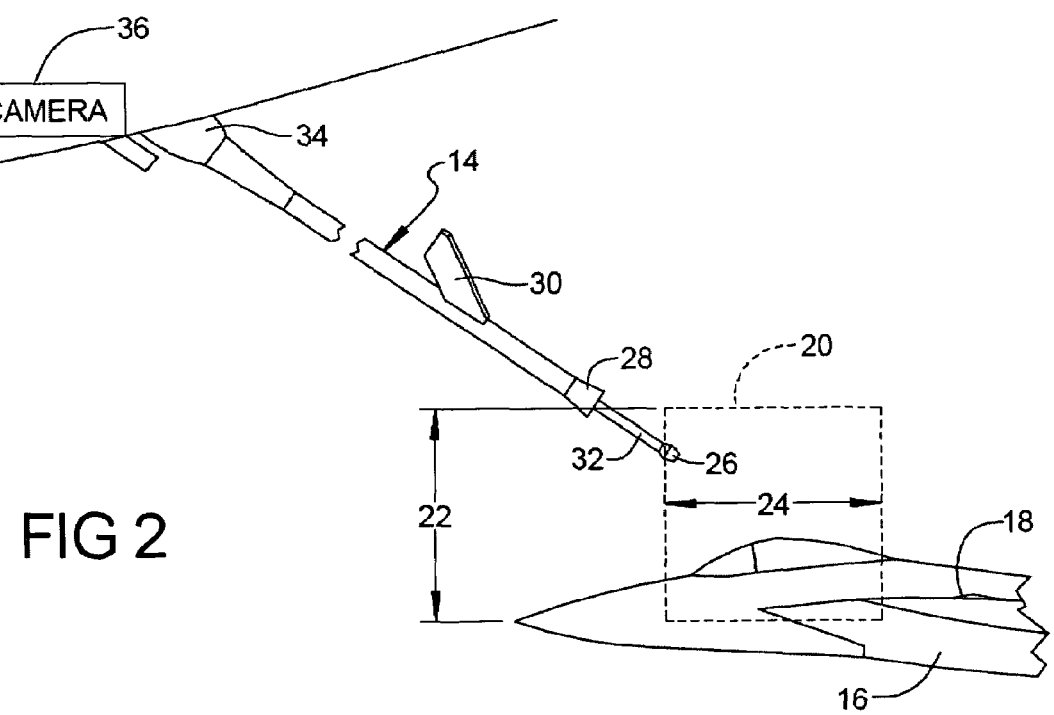
FIG. 2 is an enlarged side view of a portion of the receiver aircraft of FIG. 1, the tanker aircraft and the boom, and further illustrating a desired contact zone within which contact between the refueling receptacle of the receiver aircraft and the tip of the boom needs to occur.

Referring to FIG. 2, the receiver aircraft 16 and its associated refueling receptacle 18 can be seen relative to the boom 14. Dashed line 20 represents a "contact zone" having an elevation 22 and a distance 24 within which contact between a tip 26 of boom 14 needs to be made. The boom 14 can be seen to include a conventional ice shield 28 and a pair of conventional ruddervators 30 for assisting the boom operator in aiming the boom 14. A telescoping fuel tube 32 is housed within the boom 14. The boom 14 also includes sensors (not shown) that are associated with a sensor system carried onboard the tanker aircraft 12 for providing information on the position of the boom 14 relative to the tanker aircraft 12. In essence, the refueling receptacle 18 forms a "virtual target" which the boom operator aims the boom tip 26 toward while extending the telescoping fuel tube 32 that supplies fuel through the boom 14 to the boom tip 26.

With further reference to FIG. 2, a boom sensor subsystem 34 disposed adjacent the boom 14 is used for sensing the relative location of the tip 26 of the boom (including both the elevation and azimuth planes) relative to the tanker aircraft 12. A camera system 36, which in one preferred implementation is a digital camera system, provides a real time image to the boom operator using the system 10 to assist the boom operator in visualizing the receiver aircraft 16 and the refueling receptacle 18 during the refueling operation. The camera system 36 image also helps the boom operator to sense the distance between the boom tip 26 and the refueling receptacle 18.

Figure 3:
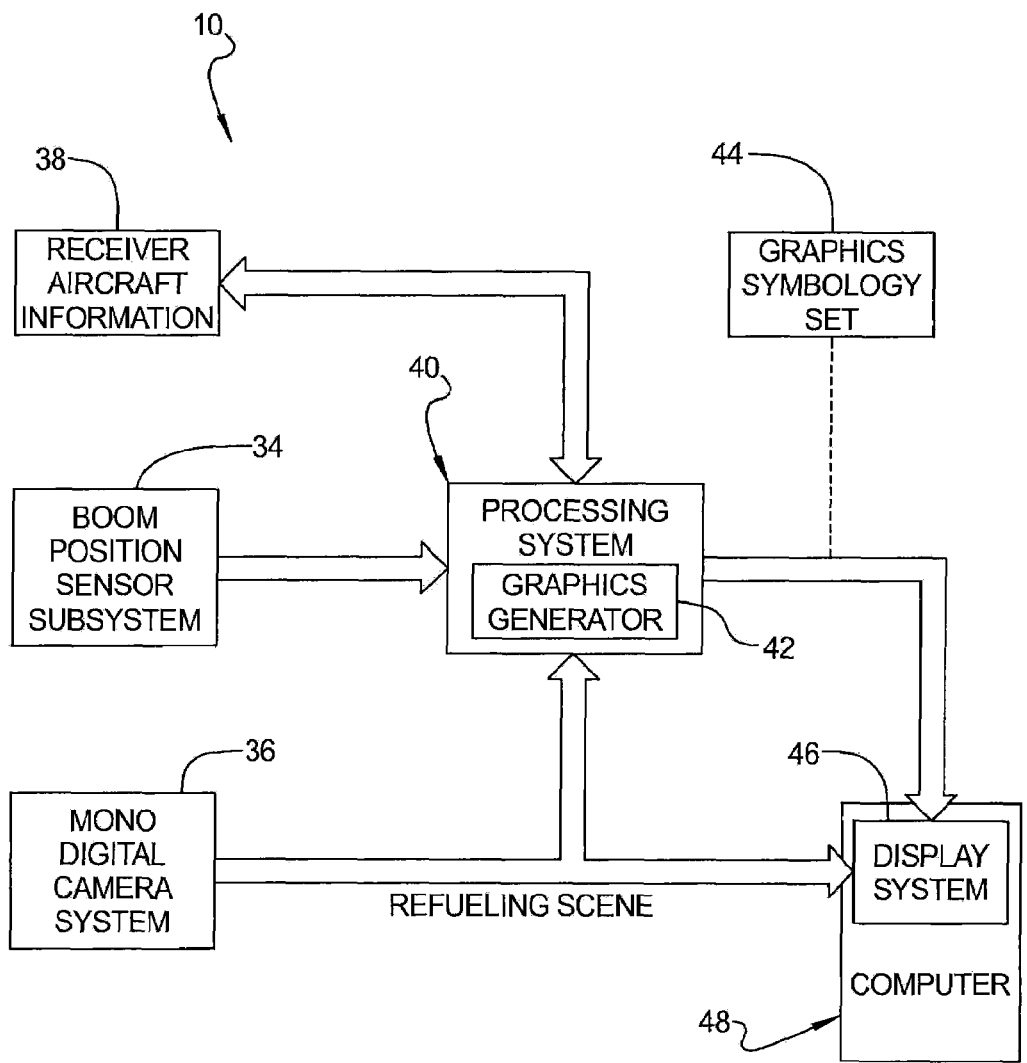
FIG. 3 is a simplified block diagram of a preferred embodiment of the present invention.

Referring to FIG. 3, the system 10 of the present invention is shown in greater detail. The system incorporates the camera system 36 together with the boom position sensor subsystem 34 and a conventional receiver aircraft A/R (aircraft refueling) data subsystem 38. The A/R data subsystem 38 provides information on the specific type of aircraft being refueled (e.g., size, fuel capacity, etc.). Each of components 34, 36 and 38 feeds signals into a processing system 40 having a graphics generator 42. The processing system 40 includes video processing componentry and pixel count/position algorithms, in accordance with Boeing-owned U.S. Pat. No. 6,752,357, incorporated by reference herein, to derive distance and position information from the camera system 36 and the boom sensor subsystem 34, and to provide a graphics symbology set 44 that can be displayed on a display system 46 of a computer 48. The camera system 36 provides a real time image of the receiver vehicle 16 and its refueling receptacle 18 on the display system 46. The display system 46 may comprise an LCD display or a CRT display, or any other display system suitable for displaying both graphics symbols as well as real time video images.

A suitable digital camera system for use with the present invention is commercially available from Dalsa Corp. of Waterloo, Ontario, Canada. The boom position sensor subsystem 34 comprises a plurality of sensors that are used to detect the position of the boom 14 relative to the tanker aircraft 12. Suitable boom position sensor systems are disclosed in U.S. Pat. Nos. 6,651,933 and 6,837,462, owned by the Boeing Co. and hereby incorporated by reference into the present application. Various suitable boom position sensors (e.g., LVDT/RVDT transducers) and sensing subsystems are also widely commercially available. Additional U.S. patents owned by the Boeing Co., which relate to various components of refueling booms and/or tanker refueling systems, and which are all hereby incorporated by reference into the present application, are: U.S. Pat. Nos. 4,586,683; 4,298,176; 5,996,939; 5,785,276; 4,792,107; 4,633,376; 4,519,560; 4,264,044; 4,231,536; 4,160,534; 4,158,885; 4,129,270; 4,095,761; 4,072,283; and 4,025,193.

The processing system 40 may comprise any suitable processor capable of processing the information from the position sensor subsystem 34 and the digital camera system 36 to provide real time information that the graphics generator 42 can use to generate the graphics symbology set 44 that is displayed on the display system 46. The computer 48 may comprise a personal computer or any other suitable form of computer having a suitable video card and processing power able to display the real time images generated by the digital camera system 36 and the graphics symbology set 44.

Figure 4:
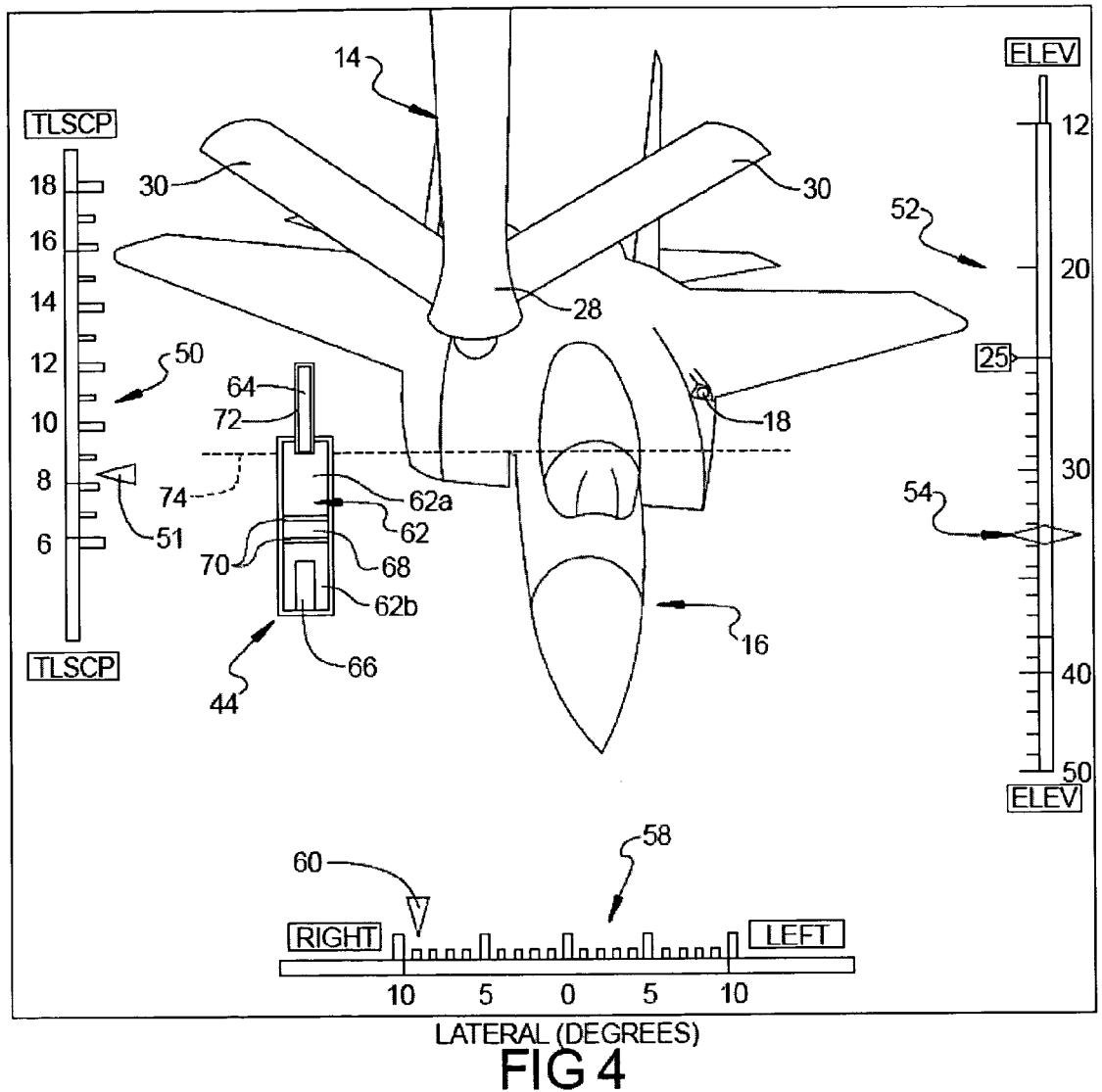
FIG. 4 is a view of what the boom operator views on the display system of FIG. 3.

Referring to FIG. 4, the graphics symbology set 44 is illustrated overlayed on an image of the receiver aircraft 16 on the display system 46. Optionally, but preferably, the boom position sensor subsystem 34 (FIG. 3) provides information relating to the telescoped length of the boom 14 in the form of a scaled, linear graph 50. Graph 50 and indicator arrow head 51 shows the boom operator the length that the boom tip 26 is telescoped to at any given time during the refueling operation. Optionally, but preferably, an elevation bar graph 52 is also provided that informs the boom operator of the elevation of the boom 14 horizontal axis relative to the tanker aircraft 12. In this example the optimum contact point elevation is designated by the diamond graphic 54 (indicating an elevation of about 32 degrees relative to the tanker aircraft 12).

Referring also to FIG. 3, the camera system 36 also provides boom tip 26 (FIG. 2) position information to the processing system 40 that enables the processing system to generate a horizontal, linear graph 58 that assists the boom operator in determining the lateral displacement of the boom 14 relative to a center line of the tanker aircraft 12. Indicator 60 indicates the present position of the boom 14 while the "0" position on the graph 58 indicates the center line position of the refueling boom 14.

In each of the graphs 50, 52 and 58, colors may be employed to assist the operator in aligning the boom 14. The color green indicates normal operating limits of the boom 14.

Referring further to FIG. 4, the graphics symbology set 44 will now be described. The graphics symbology set 44 also preferably makes use of colors to assist the boom operator in quickly visually determining the position of the boom tip 26, as well as the position of the receiver aircraft 16. The graphics symbology set 44 is formed by a foundation graphic symbol 62 that represents the depth of the contact zone 20 (FIG. 2) (i.e., distance 24 in FIG. 2), plus "lead-in" areas 62a and 62b, to provide contrast for a receiver aircraft symbol 64 and a tanker aircraft symbol 66. The fixed foundation graphic symbol 62 has an interior area which in this example is represented by the color black, and is outlined in green. The contact zone 20 is defined by a graphic contact zone rectangle 68, which in this example is colored green, but outlined by parallel white strips 70. The black areas above and below the contact zone rectangle 68 thus represent the lead-in areas 62a and 62b, which, in practice, represent only the last several feet (e.g., 10 feet-20 feet; 3.05 m-6.1 m) of the receiver aircraft's 16 closure to the contact zone 20.

The receiver aircraft symbol 64 is preferably also colored with a unique color, in this example grey, and is preferably outlined in a different color, for example a yellow band 72. A horizontal dashed line 74 is also provided that represents an "receiver elevation lead-in" line for indicating an optimum receiver aircraft elevation as the receiver aircraft 16 moves forward and aft within the refueling region at the rear of the tanker aircraft 12. The elevation line 74 will move up and down relative to the receiver symbol 64 to indicate the position of the refueling receptacle 18 lead-in relative to the optimum contact point elevation within the contact zone 20. The lower edge of the receiver symbol 64 touching the elevation lead-in line 74, as shown in FIG. 4, indicates the correct receiver aircraft 16 elevation relative to the optimum contact point in the contact zone 20. If the receiver symbol 64 is displayed above the elevation lead-in line 74, it represents a receiver refueling receptacle being above the optimum elevation; if the receiver symbol 64 crosses the elevation lead-in line 74, it represents the receiver aircraft 16 being at too low an elevation for contact to occur between the boom tip 26 and the refueling receptacle 18.

With reference to FIGS. 5A-5H, the graphics symbology set 44 can be seen to provide an immediate visual indication to the boom operator of various conditions and positions of the boom tip 26 and the receiver aircraft 16 during the refueling operation. When the receiver aircraft 16 is moving forward toward the contact zone 20, the processing system 40 derives the receiver aircraft 16 distance to the contact zone 20 by information supplied from the camera system 36. The closure rate of the receiver symbol 64 towards the contact zone rectangle 68 is scaled in accordance with this distance information. FIG. 5A illustrates the receiver aircraft symbol 64 (i.e., representing receiver aircraft 16) moving toward the contact zone rectangle 68, but at an elevation that is above the elevation lead-in line 74. This indicates that the receiver aircraft 16 needs to reduce its elevation before contact between the boom tip 26 and its refueling receptacle 18 can be made in the contact zone 20. The boom symbol 66 is shown having a length only about halfway to the contact zone rectangle 68, indicating that the fuel tube 32 has not been telescoped yet to reach the contact zone 20.

FIG. 5B indicates the receiver aircraft symbol 64 with its lower end just touching the elevation lead-in line 74 indicating that the receiver aircraft 16 is at the optimum elevation for contact to be made between the boom tip 26 and the refueling receptacle 18. FIG. 5B indicates the boom symbol 66 being the same height as FIG. 5A, thus indicating that the boom fuel tube 32 has not yet been telescoped into the contact zone rectangle 68.

In FIG. 5C, the receiver symbol 64 is illustrated as a flashing yellow, vertically oriented rectangle indicating that the receiver aircraft 16 is closing to the contact zone rectangle 68 at a rate of speed that exceeds a predetermined safe closing rate (e.g., 10 ft/sec; 3.04 meters/sec). The frequency of the flashing of the receiver symbol 64 can be varied but in one preferred form it is approximately ten cycles per second. This also provides an instantaneous visual cue to the boom operator so the boom operator can inform the pilot of the receiver aircraft 16 to adjust his/her speed accordingly.

In FIG. 5D, the receiver symbol 64 is indicated with its lower end inside the contact zone rectangle 68. At this point the boom 14 can be fully telescoped into the contact zone 20 to make contact between the boom tip 26 and the refueling receptacle 18. The distance indicated as "shadow gap" in FIG. 5D represents the shadow that often appears on the receiver aircraft 16, under certain lighting conditions, that the boom operator sees when viewing the receiver aircraft 16. This shadow has traditionally been helpful to the boom operator in gauging the distance between the boom tip 26 and the receiver refueling receptacle 18.

FIG. 5E illustrates the boom symbol 66 having been elongated to reach the contact zone rectangle 68 so that the boom tip 26 is engaged with the refueling receptacle 18. Boom symbol 66 is increased in length in accordance with the telescoping movement of the boom 14, and scaled to the distance that the boom 14 covers to the contact zone 20.

Referring to FIG. 5F, if contact between the boom tip 26 and the refueling receptacle 18 has been made, and then the receiver aircraft 16 moves forwardly past the contact zone rectangle 68, the portion 64a of the receiver symbol 64 extending forwardly of the contact zone rectangle 68 is turned to a different color, in this example red. This provides an immediate visual cue to the boom operator that the receiver aircraft 16 needs to move back in the aft direction relative to the refueling aircraft 12 to position its refueling receptacle 18 at a point where contact can be safely maintained with the boom tip 26. The length of portion 64a is also scaled to give the boom operator an immediate visual cue as to the distance by which the receiver aircraft 16 needs to move in the aft direction.

FIG. 5G shows the receiver symbol 64 with lower portion 64a thereof in a different color, in this example red, indicating that the receiver aircraft 16 is in contact with the boom tip 26 but too far aft of the limit of extension of the boom 14. In this condition there is a risk of the boom tip 26 being pulled out of the refueling receptacle 18. The height of lower portion 64a is scaled to indicate the approximate distance by which the receiver aircraft 16 needs to move forwardly to be at the optimum distance, relative to the tanker aircraft 12, while the boom tip 26 is engaged with the refueling receptacle 18.

FIG. 5H illustrates the receiver symbol 64 having a leading edge positioned below the contact zone rectangle 68, with lower portion 64a thereof being in a different color, in this example red. An upper end of the boom symbol 66 is not in contact with the lower edge of portion 64a, thus indicating that the boom tip 26 is not in contact with the refueling receptacle 18. However, in this example the lower portion 64a indicates that the receiver aircraft 16 is dangerously forward of the contact zone 20 (i.e., too close to the refueling aircraft 12).

In FIGS. 5A-5H a "boom aim point" graphic symbol 76 can also be used and overlayed on the image being projected on the display system 46 (see also FIGS. 3 and 4). Boom aim point graphic symbol 76 indicates the point on the receiver aircraft 16 that the boom tip 26 is presently being aimed at. Traditionally, this task has been performed successfully for many years in tanker aircraft equipped with a direct view window. However, in a stereoscopic video system equipped with a remote aerial refueling operator (RARO) station, the possibility of the failure of one camera or video circuit raises the possibility of the operation being conducted under monoscopic conditions. Such a condition would suppress the boom operator's natural ability to detect the relative distance separating two objects. This depth sense helps the operator to gauge the point upon the receiver aircraft 16 that the boom tip 26 would contact if the boom refueling tube 32 (FIG. 2) were to be telescoped at any given time during the refueling operation while the receiver aircraft 16 is within the lead-in areas 62a, 62b. To avoid inadvertently striking the receiver aircraft 16 at any other point other than the refueling receptacle 18, the boom operator controls the boom 14 as needed to ensure that the boom aim point graphic 76 is held over the image of the refueling receptacle 18 on the display system 46 whenever the boom tip 26 is perceived to be near the receiver aircraft 16.

While the graphics symbology set 44 has been illustrated as a plurality of rectangular symbols aligned along a vertical axis, it will be appreciated that the symbols used could vary widely in size and shape. Any symbols that enable an immediate visual representation to be provided as to the position of the receiver aircraft 16, the lead-in areas leading to the contact zone 20, and the contact zone 20 itself, can be used. The use of various colors also aids the boom operator by providing immediate visual cues of undesired or dangerous conditions developing during the refueling operation.

It will also be appreciated that the sensors needed for sensing the distance of the receiver aircraft 16 relative to the contact zone 20, could be provided by a variety of systems. For example, distance sensing between the receiver aircraft 16 and the contact zone 20 can be accomplished by information gleaned from the camera system 36, as described in connection with FIG. 2. Alternatively, laser or radio frequency separation measurement equipment could be employed to determine this distance. In any event, this information is used to provide a real time indication as to the distance separating the refueling receptacle 18 on the receiver aircraft 16 and the optimum point in space (i.e., within the contact zone 20) behind the tanker aircraft 12 for boom tip 26 contact to occur with the refueling receptacle 18.

With specific regard to the boom 14 separation distance from the refueling receptacle 18, one alternative enhancement would be the use of a boom extension distance sensor signal which would be processed to show, on display system 46, an absolute distance between the boom tip 26 and the optimum contact point in the contact zone 20 behind the refueling tanker 12 for boom contact to occur with the refueling receptacle 18. Still further, another alternative enhancement could be using the boom symbol 66 to display a number inside of it that represents an actual distance between the boom tip 26 and the nearest point on the surface of the receiver aircraft 16. In this instance the actual boom 14 extension distance would be implied by its contact with the refueling receptacle 18. In the absence of a refueling receiver 18 in position to receive the boom tip 26, the boom symbol 66 would not be used to judge the boom extension length relative to the optimum contact point. In this case boom 14 extension distance would be monitored via reference to a telescoping distance scale as shown in FIGS. 5A-5H.

The system and method of the present invention thus provides a means for providing a boom operator with a graphics symbology set that enables a plurality of important conditions to be presented in an easy to comprehend visual format, to thus aid the boom operator during a refueling operation. The graphics symbology set 44 also can be used to provide various warnings, in different colors, to instantly alert the boom operator that an undesired condition has developed, as well as what corrective action needs to be taken either by the boom operator or by the pilot of the receiver vehicle 16. The system and method of the present invention can be integrated for use with a variety of refueling tankers and with a relatively small number of independent components, and in some instances may even use existing sensor systems already present on a refueling tanker.

While various preferred embodiments have been described, those skilled in the art will recognize modifications or variations which might be made without departing from the inventive concept. The examples illustrate the invention and are not intended to limit it. Therefore, the description and claims should be interpreted liberally with only such limitation as is necessary in view of the pertinent prior art.

What is claimed is:

1. A graphical symbol apparatus for use on a display system used by an operator in an aerial refueling operation between an airborne tanker vehicle and an airborne receiver vehicle, the apparatus comprising:
   a receiver graphic representing said receiver vehicle and moveable in accordance with a position of said receiver vehicle;
   a boom graphic having a length that changes and is scaled in accordance with telescoping movement of a refueling boom;
   a contact zone graphic indicating an area in which contact can be made between said refueling boom and said receiver vehicle; and
   said receiver graphic and said boom graphic providing a visual representation of when said refueling boom and said receiver vehicle are in position for contact to be made between said refueling boom and a refueling receptacle of said receiving vehicle.

2. The apparatus of claim 1, wherein said receiver vehicle graphic is moveable linearly towards and away from said boom graphic, and scaled in accordance with a closing rate of said receiver vehicle.

3. The apparatus of claim 1, wherein said boom graphic, said contact zone graphic and said receiver vehicle graphic are linearly aligned on said display.

4. The apparatus of claim 1, further comprising a foundation graphic within which said contact zone graphic is disposed, the foundation graphic representing lead-in areas fore and aft of said contact zone.

5. The apparatus of claim 1, further comprising an elevation graphic, moveable in relation to said receiver vehicle graphic, for representing a desired elevation that said receiver vehicle needs to be at before contact can be made between said refueling boom and said refueling receptacle.

6. The apparatus of claim 3, wherein said elevation graphic comprises a dashed line movable towards and away from an edge portion of said receiver vehicle graphic, said elevation graphic being generally coplanar with said edge portion when said receiver vehicle is at an elevation at which contact between said refueling boom and said receiver receptacle can be made.

7. The apparatus of claim 1, wherein said boom graphic and said receiver vehicle graphic are different colors.

8. The apparatus of claim 1, wherein said contact zone graphic is a different color from said boom graphic and said receiver vehicle graphic.

9. The apparatus of claim 1, wherein said receiver vehicle graphic is presented as a flashing symbol when a closing rate of speed of said receiver vehicle toward said refueling vehicle exceeds a predetermined safe closing rate of speed.

10. The apparatus of claim 1, further comprising a boom aim graphic that is overlayed on said display to indicate where on said receiver vehicle a tip of said boom would contact if said tip was telescoped into contact with said receiver vehicle.

11. A graphical symbol apparatus for use on a display system used by an operator in an aerial refueling operation between an airborne tanker vehicle and an airborne receiver vehicle, the apparatus comprising:
   a contact zone graphic representing a desired contact zone within which contact between a refueling boom of said refueling vehicle and a refueling receptacle of said refueling vehicle can be made;
   a receiver graphic representing said receiver vehicle and moveable in accordance with a position of said receiver vehicle, said movement of said receiver graphic further being scaled in accordance with a sensed speed of said receiver vehicle;
   a boom graphic modified in accordance with telescoping movement of said refueling boom; and
   said receiver graphic and said boom graphic providing a visual representation of when said refueling boom and said receiver vehicle are in position within said contact zone for contact to be made between said refueling boom and said refueling receptacle; and
   wherein an edge portion of said receiver graphic contacts an edge portion of said boom graphic when a tip of said refueling boom has made contact with a refueling receptacle of said receiver vehicle.

12. The apparatus of claim 11, further comprising a foundation graphic within which said contact zone graphic is disposed, the foundation graphic including an elongated area representing lead-in areas fore and aft of said contact zone to further apprise a boom operator of relative positions of said refueling boom and said receiver vehicle before said refueling boom and said receiver vehicle enter said contact zone.

13. The apparatus of claim 11, further wherein a length of said boom graphic is modified in accordance with telescoping movement of said boom towards said contact zone.

14. The apparatus of claim 11, wherein said receiver graphic is caused to become a flashing graphic when a closing speed of said receiver vehicle toward said contact zone exceeds a maximum predetermined closing speed.

15. The apparatus of claim 11, wherein said contact zone graphic, said receiver graphic and said boom graphic are all different colors.

16. The apparatus of claim 11, further comprising an elevation lead in graphic for representing a desired elevation of said receiver vehicle before contact between said refueling boom and said refueling receptacle is attempted, said elevation lead in graphic being aligned with an edge of said receiver graphic when said receiver vehicle is at said desired elevation.

17. The apparatus of claim 11, wherein a first portion of said receiver graphic is presented in a first color, and a second portion of said receiver graphic is presented in a second color different from said first color, when said refueling boom is in contact with said refueling receptacle but while said receiver vehicle has moved forwardly, relative to said airborne tanker vehicle, to move said refueling boom partially out of said contact zone.

18. A graphical symbol apparatus for use on a display system used by an operator in an aerial refueling operation between an airborne tanker vehicle and an airborne receiver vehicle, the apparatus comprising:
   a contact zone graphic representing a desired contact zone, relative to said refueling vehicle, within which contact between a refueling boom of said refueling vehicle and a refueling receptacle of said refueling vehicle can be made;
   a receiver graphic representing said receiver vehicle and moveable linearly in accordance with a position of said receiver vehicle, relative to said contact zone, said movement of said receiver graphic further being scaled in accordance with a sensed speed of said receiver vehicle;
   a boom graphic scaled in dimension in accordance with telescoping movement of said refueling boom and linearly aligned with said contact zone graphic;
   said receiver graphic and said boom graphic providing a visual representation of when said refueling boom and said receiver vehicle are in position within said contact zone for contact to be made between said refueling boom and said refueling receptacle; and
   wherein contact between an edge portion of said receiver graphic and an edge portion of said boom graphic indicates that said refueling boom has made contact with said refueling receptacle of said receiver vehicle.

* * * * *